(12) United States Patent
Nakano et al.

(10) Patent No.: US 9,130,481 B2
(45) Date of Patent: Sep. 8, 2015

(54) POWER CONVERTING APPARTATUS

(75) Inventors: Kosuke Nakano, Chiyoda-ku (JP); Tetsuya Kojima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 475 days.

(21) Appl. No.: 13/612,181

(22) Filed: Sep. 12, 2012

(65) Prior Publication Data

US 2013/0194852 A1 Aug. 1, 2013

(30) Foreign Application Priority Data

Feb. 1, 2012 (JP) ................................ 2012-019679

(51) Int. Cl.

| | |
|---|---|
| H02P 27/04 | (2006.01) |
| H02P 6/14 | (2006.01) |
| H02M 7/5387 | (2007.01) |
| H02P 27/08 | (2006.01) |
| B60L 3/00 | (2006.01) |
| B60L 15/00 | (2006.01) |

(52) U.S. Cl.
CPC ......... H02M 7/53875 (2013.01); B60L 3/0061 (2013.01); B60L 15/007 (2013.01); H02P 27/08 (2013.01); Y02T 10/644 (2013.01)

(58) Field of Classification Search
CPC ..... B60L 3/0061; B60L 15/007; H02P 27/08; Y02T 10/644; H02M 7/53875
USPC .......................................... 318/800; 363/131
See application file for complete search history.

(56) References Cited

U.S. PATENT DOCUMENTS

| | | | | |
|---|---|---|---|---|
| 5,625,539 | A | * | 4/1997 | Nakata et al. .................... 363/17 |
| 8,604,732 | B2 | * | 12/2013 | Kawashima et al. .... 318/400.27 |
| 2006/0256586 | A1 | * | 11/2006 | Ohshima et al. ................ 363/16 |
| 2009/0212733 | A1 | * | 8/2009 | Hsieh et al. .................... 318/729 |

(Continued)

FOREIGN PATENT DOCUMENTS

| | | |
|---|---|---|
| JP | 2001-327173 A | 11/2001 |
| JP | 2005269769 A | 9/2005 |

(Continued)

OTHER PUBLICATIONS

German Office Action dated Sep. 9, 2013, German Patent Application No. 10 2012 220 649.3.

(Continued)

*Primary Examiner* — Bentsu Ro
*Assistant Examiner* — Zemenay Truneh
(74) *Attorney, Agent, or Firm* — Sughrue Mion, PLLC; Richard C. Turner

(57) ABSTRACT

In a power converting apparatus having a plurality of phases on an AC side and configured to perform conversion between DC power and AC power, a current detector detects currents flowing through a DC source line through which a plurality of phase currents commonly flow. A control unit sets a current detection period and a succeeding current control period in each successive control cycle. Using first gate signals based on reference gate signals for PWM control, the control unit calculates values of the individual phase currents from the first gate signals and the detected currents during the current detection period. Then, during the current control period, the control unit performs PWM control using phase voltage commands generated by correcting phase voltage target values so as to cancel out voltage errors that occur during the current detection period.

8 Claims, 10 Drawing Sheets

(56) References Cited

U.S. PATENT DOCUMENTS

| | | | |
|---|---|---|---|
| 2010/0165682 A1* | 7/2010 | Sakakibara | 363/126 |
| 2011/0080125 A1* | 4/2011 | Shimada et al. | 318/400.09 |
| 2011/0101906 A1* | 5/2011 | Tagome | 318/722 |
| 2011/0133678 A1* | 6/2011 | Tomigashi | 318/400.04 |
| 2011/0156629 A1* | 6/2011 | Satou et al. | 318/453 |
| 2012/0163046 A1* | 6/2012 | Hibino | 363/37 |

FOREIGN PATENT DOCUMENTS

| | | | |
|---|---|---|---|
| JP | 4625147 B2 | 2/2011 | |
| JP | 4671000 B1 | 4/2011 | |
| JP | 2011-131860 A | 7/2011 | |

OTHER PUBLICATIONS

Yikun Gu, et al "Switching-State Phase Shift Method for Three-Phase-Current Reconstruction With a Single DC-Link Current Sensor" IEEE transactions on industrial electronics, vol. 58, No. 11, Nov. 2011.

Japanese Office Action (Notice of Reasons for Rejection), mailed Dec. 17, 2013; Application No. 2012-019679.

* cited by examiner

FIG. 4

| VOLTAGE VECTOR | SWITCHING STATE | | | DETECTABLE CURRENT |
|---|---|---|---|---|
| | U | V | W | |
| V10 | 0 | 0 | 0 | - |
| V11 | 0 | 0 | 1 | iw1 |
| V12 | 0 | 1 | 0 | iv1 |
| V13 | 0 | 1 | 1 | -iu1 |
| V14 | 1 | 0 | 0 | iu1 |
| V15 | 1 | 0 | 1 | -iv1 |
| V16 | 1 | 1 | 0 | -iw1 |
| V17 | 1 | 1 | 1 | - |

FIG. 5

| VOLTAGE VECTOR | SWITCHING STATE | | | DETECTABLE CURRENT |
|---|---|---|---|---|
| | U | V | W | |
| V20 | 0 | 0 | 0 | - |
| V21 | 0 | 0 | 1 | iw2 |
| V22 | 0 | 1 | 0 | iv2 |
| V23 | 0 | 1 | 1 | -iu2 |
| V24 | 1 | 0 | 0 | iu2 |
| V25 | 1 | 0 | 1 | -iv2 |
| V26 | 1 | 1 | 0 | -iw2 |
| V27 | 1 | 1 | 1 | - |

POWER CONVERTING APPARTATUS

BACKGROUND OF THE INVENTION

1. Field of the Invention

The present invention relates to a power converting apparatus for performing conversion between DC power and AC power by using a plurality of semiconductor switching devices and, more particularly, to a power converting apparatus configured to operate by pulse-width modulation (PWM) control operation while detecting a plurality of phase currents.

2. Description of the Background Art

A conventional arrangement for increasing an output of a power converting apparatus is to use a multiplex inverter in which a plurality of three-phase inverters are connected in parallel. This kind of multiplex inverter is provided with three-phase inverters each including three current detectors and operates by PWM control while detecting individual phase currents (refer to Japanese Patent No. 4625147 and Japanese Patent Application Publication No. 2011-131860, for example).

A conventional arrangement for detecting phase currents of a three-phase inverter is as follows. A power converting apparatus repeatedly executes inverter control operation at intervals of an inverter control period having a specific length. A phase current detection period during which the phase currents are detected is provided between successive inverter control periods. The power converting apparatus controls switching states of individual switching devices of inverter circuits so that a shunt resistor outputs a voltage pulse having a pulse duration larger than that of a voltage pulse output during the inverter control period during each phase current detection period (refer to Japanese Patent No. 4671000, for example).

The conventional multiplex inverter like those of Japanese Patent No. 4625147 and Japanese Patent Application Publication No. 2011-131860 cited above is provided with a plurality of three-phase inverters each including three current detectors. Thus, the total number of the current detectors required in each of such multiplex inverters is three times the number of the three-phase inverters. A problem of this arrangement is therefore an increase in size of the apparatus associated with an increase in manufacturing cost.

In the power converting apparatus described in Japanese Patent No. 4671000 cited above which is configured to detect the individual phase currents by using a single current detector, an output voltage of the current detector is kept at a fixed level during each phase current detection period. A problem of this arrangement is that voltage and current output waveforms can be distorted if the output voltage deviates from a desired voltage.

SUMMARY OF THE INVENTION

The present invention has been devised to solve the aforementioned problems. Accordingly, it is an object of this invention to provide a power converting apparatus configured to operate by PWM control while detecting a plurality of phase currents, the power converting apparatus having a capability to detect the individual phase currents and obtain a desired output in a reliable fashion with a compact and simple apparatus structure.

According to the invention, a power converting apparatus having a plurality of phases on an AC side includes a main circuit unit for performing conversion between DC power fed from a DC power source and AC power and a control unit for repetitively controlling the main circuit unit in successive control cycles, wherein a DC source line through which phase currents flowing in the individual phases commonly flow is connected to the DC power source. The control unit includes a current detector for detecting the currents flowing through the DC source line, a PWM controller for generating gate signals to be supplied to individual semiconductor switching devices of the plurality of phases of the main circuit unit, the PWM controller having a current detection period and a succeeding current control period within each of the control cycles which are defined based on a carrier period, that is, the period of carrier waves, and a current processor for calculating values of the individual phase currents during the current detection period based on the gate signals fed from the PWM controller and the detected currents fed from the current detector. The PWM controller generates the gate signals to be used during the current detection period based on preset reference gate signals, generates phase voltage target values so that the individual phase current values calculated will follow given command values, calculates phase voltage commands by correcting the individual phase voltage target values so as to cancel out voltage errors that occur during the current detection period, and generates the gate signals to be used during the current control period based on a comparison between the individual phase voltage commands and the carrier waves.

According to the present invention, the control unit calculates the values of the individual phase currents by detecting the currents flowing through the DC source line, so that it is possible to obtain the individual phase current values by means of the single current detector which is commonly used for the individual phases without requiring a plurality of current detecting means therefor. Also, the control unit performs PWM control operation for controlling the main circuit unit by calculating the phase voltage commands for the individual phases to be used during the current control period so as to cancel out voltage errors that occur during the current detection period. It is therefore possible to reliably detect the values of the individual phase currents, suppress distortions of voltage and current output waveforms, and reliably obtain a desired output with a compact and simple apparatus structure. Additionally, when applied to a power converting apparatus employing a multiplex configuration involving an increased number of kinds of phase currents, the invention makes it possible to achieve an even more remarkable reduction in size and simplification of the apparatus structure.

The foregoing and other objects, features, aspects and advantages of the present invention will become more apparent from the following detailed description when read in conjunction with the accompanying drawings.

BRIEF DESCRIPTION OF THE DRAWINGS

FIG. 4 is a tabular representation for explaining detection of phase currents of a first three-phase inverter according to the first embodiment of the invention;

FIG. 5 is a tabular representation for explaining detection of phase currents of a second three-phase inverter according to the first embodiment of the invention;

DETAILED DESCRIPTION OF THE PREFERRED EMBODIMENTS OF THE INVENTION

First Embodiment

Figure 1A:
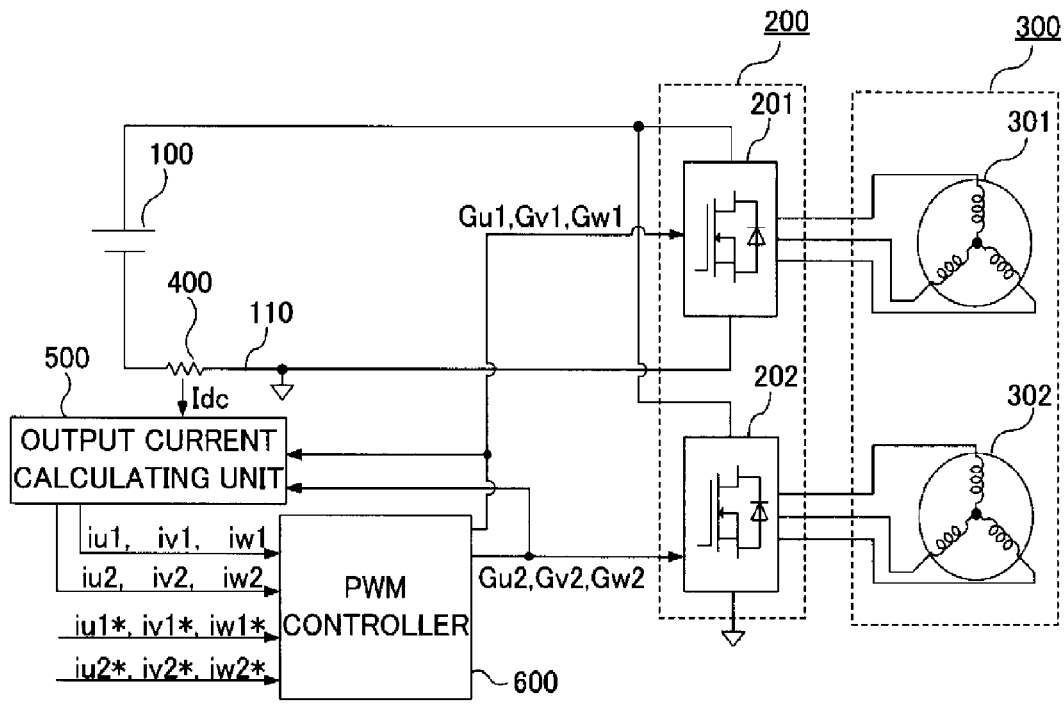
FIGS. 1A and 1B are diagrams depicting the configuration of a motor driving system implementing a power converting apparatus according to a first embodiment of the invention.
Figure 1B:
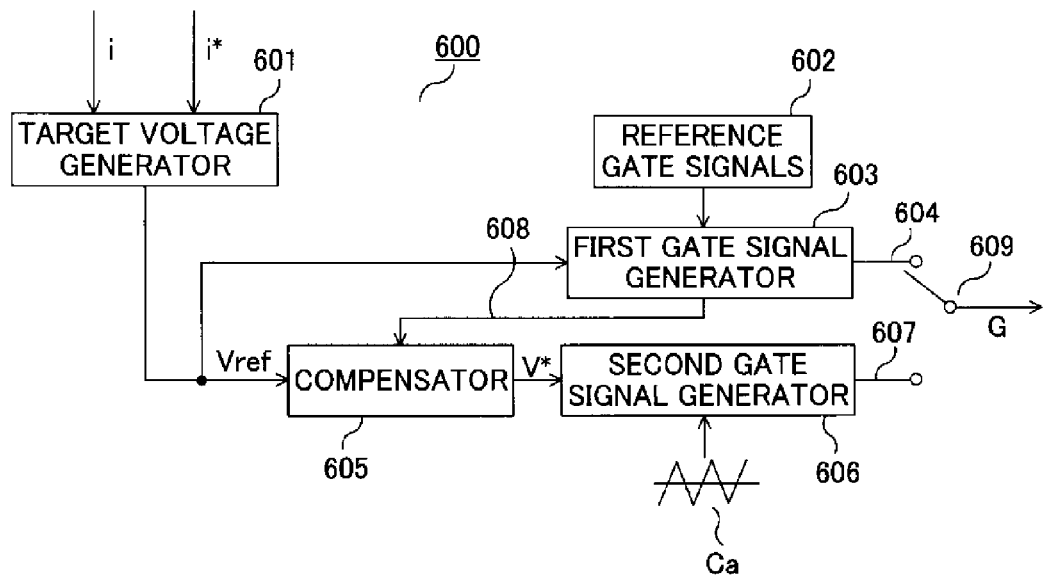

FIG. 1A is a diagram depicting the configuration of a motor driving system implementing a power converting apparatus according to a first embodiment of the present invention, and FIG. 1B is a control block diagram representing in particular a detailed configuration of a PWM controller 600 depicted in FIG. 1A.

Configured as depicted in these Figures, the motor driving system converts DC power fed from a DC power source 100 into AC power by means of a multiplex power converter 200 and supplies the AC power to a motor 300. The multiplex power converter 200 includes a first three-phase inverter 201 and a second three-phase inverter 202. These three-phase inverters 201, 202 which are connected in parallel on a DC side together constitute a main circuit unit of the power converting apparatus. For controlling the multiplex power converter 200, the power converting apparatus includes a current detecting device 400 serving as a current detector, an output current calculating unit 500 serving as a current processor and a control unit including the aforementioned PWM controller 600.

The DC power source 100 is configured with a battery, for instance, and the motor 300 is a 6-phase motor having two pairs of three-phase windings 301, 302 whose neutral points are arranged independently of each other. In the multiplex power converter 200, outputs of the first three-phase inverter 201 and the second three-phase inverter 202 are controlled respectively by gate signals (Gu1, Gv1, Gw1) and (Gu2, Gv2, Gw2) supplied from the control unit for individual phases. The first three-phase inverter 201 drives the three-phase windings 301 of the motor 300 while the second three-phase inverter 202 drives the three-phase windings 302 of the motor 300. The first and second three-phase inverters 201, 202 are connected in parallel on the DC side so that phase currents of a total of six phases flow commonly through a DC source line 110 connected to the DC power source 100. The current detecting device 400 detects current Idc that flows through this DC source line 110.

Figure 2:
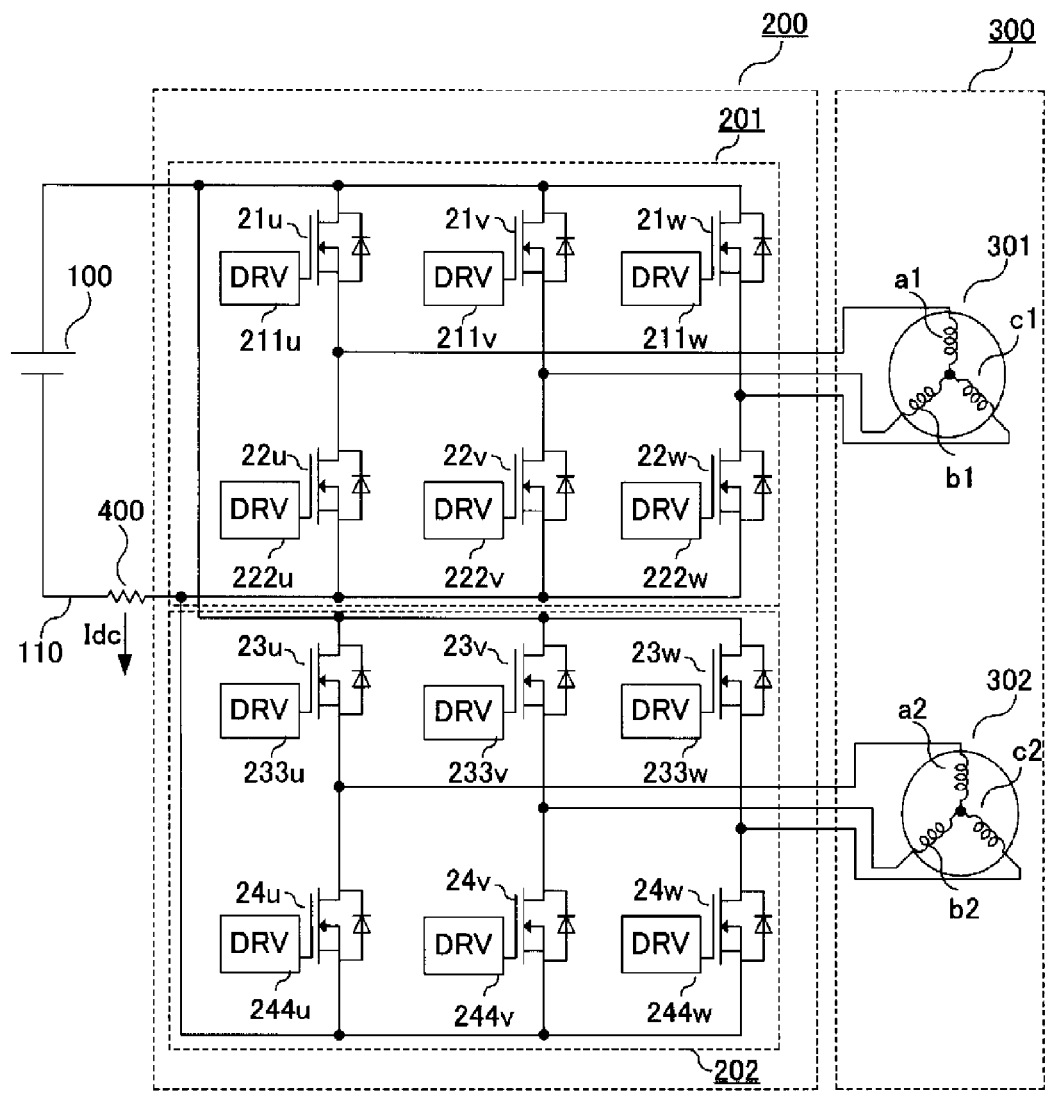
FIG. 2 is a diagram depicting in detail the configuration of a multiplex power converter according to the first embodiment of the invention.

As depicted in FIG. 2, the configuration of the multiplex power converter 200 is such that a high-DC-voltage-side bus line of the first three-phase inverter 201 and a high-DC-voltage-side bus line of the second three-phase inverter 202 are interconnected and a connecting point of these bus lines is connected to a positive terminal of the DC power source 100. Likewise, a low-DC-voltage-side bus line of the first three-phase inverter 201 and a low-DC-voltage-side bus line of the second three-phase inverter 202 are interconnected and a connecting point of these bus lines is connected to a negative terminal of the DC power source 100 through the current detecting device 400.

The first and second three-phase inverters 201, 202 each have arms for the individual phases denoted U, V and W. The arms of the U, V and W phases are configured by connecting metal oxide semiconductor field effect transistors (MOSFETs) $21u$-$21w$, $23u$-$23w$ which serve as high-voltage-side semiconductor switching devices for switching connections between the positive terminal of the DC power source 100 and AC output lines of the individual phases and MOSFETs $22u$-$22w$, $24u$-$24w$ which serve as low-voltage-side semiconductor switching devices for switching connections between the negative terminal of the DC power source 100 and AC output lines of the individual phases, respectively. Meanwhile, the MOSFETs $21u$-$21w$, $22u$-$22w$, $23u$-$23w$, $24u$-$24w$ each have a parasitic diode connected between a source and a drain.

The aforementioned MOSFETs $21u$-$21w$, $22u$-$22w$, $23u$-$23w$, $24u$-$24w$ are provided with respective driving circuits $211u$-$211w$, $222u$-$222w$, $233u$-$233w$, $244u$-$244w$ as illustrated.

The AC output lines of the individual phases of the first three-phase inverter 201 are connected to respective windings a1, b1, c1 of the three-phase windings 301, whereas the AC output lines of the individual phases of the second three-phase inverter 202 are connected to respective windings a2, b2, c2 of the three-phase windings 302.

The gate signals G (Gu1, Gv1, Gw1, Gu2, Gv2, Gw2) for the individual phases (6 phases in total) used for controlling the outputs of the first and second three-phase inverters 201, 202 are generated by the PWM controller 600. There are provided a current detection period TA and a succeeding current control period TB in each control cycle of the PWM controller 600 which includes two successive carrier periods Tc, for example. The PWM controller 600 outputs the aforementioned gate signals G for the individual phases by performing different control operations during the current detection period TA and the current control period TB.

The gate signals G for the individual phases to be used during each current detection period TA are input into the output current calculating unit 500. The output current calculating unit 500 calculates individual phase currents i (iu1, iv1, iw1, iu2, iv2, iw2) using information on the detected current Idc received from the current detecting device 400 and the gate signals G for the individual phases.

The individual phase currents i (iu1, iv1, iw1, iu2, iv2, iw2) calculated by the output current calculating unit 500 and individual phase current command values i* (iu1*, iv1*, iw1*, iu2*, iv2*, iw2*) are input into the PWM controller 600. The phase current command values i* are for controlling frequency commands or torque commands given to the motor 300 to have desired values, or for controlling the motor 300 to operate in a desired state. It is possible to use a reference sine wave for obtaining the phase current command values i*.

The PWM controller 600 includes a target voltage generator 601 for generating phase voltage target values Vref which are target values of output voltages of the individual phases of the first and second three-phase inverters 201, 202 so that the phase currents i follow the respective phase current command values i*. The PWM controller 600 also includes a first gate signal generator 603 for generating the gate signals G which become first gate signals 604 on the basis of reference gate signals 602 with reference to the phase voltage target values Vref generated in a preceding control cycle during each current detection period TA.

The PWM controller 600 also includes a compensator 605 which generates phase voltage commands V* by correcting the phase voltage target values Vref during each current control period TB. Here, when first voltage commands 608 corresponding to the gate signals G (first gate signals 604) generated during each current detection period TA are input, the compensator 605 generates the phase voltage commands V* so as to cancel out voltage errors that have occurred during the relevant current detection period TA. Then, a second gate signal generator 606 of the PWM controller 600 generates the gate signals G which become second gate signals 607 on the basis of a comparison between the phase voltage commands V* and a carrier wave Ca.

The gate signals G (first gate signals 604) generated during the current detection period TA or the gate signals G (second gate signals 607) generated during the current control period TB are selected by a switching device 609 depending on periods. The PWM controller 600 outputs the selected gate signals G to control the outputs of the first and second three-phase inverters 201, 202.

Described next with reference to FIGS. 3 to 6 are how the individual phase currents i are detected by calculation and how the gate signals G are generated for the individual phases.

Figure 3:
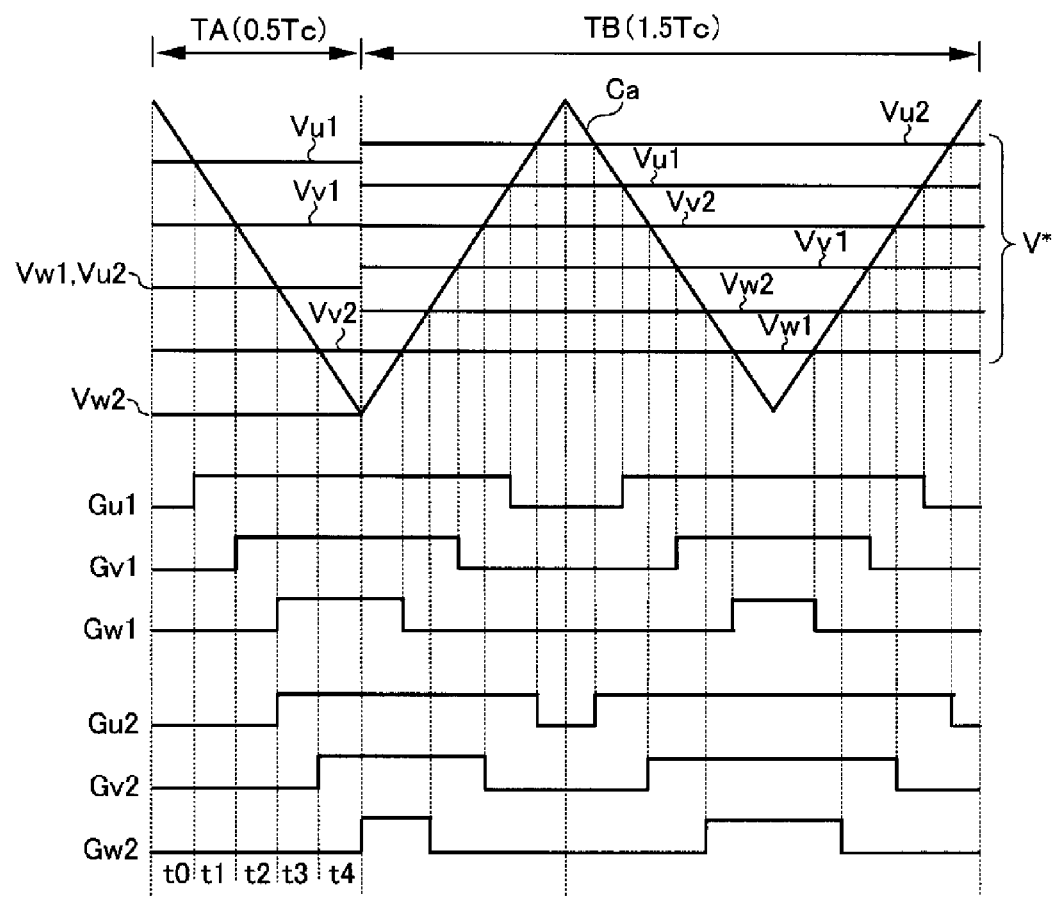
FIG. 3 is a diagram depicting waveforms for explaining gate signals used for control operation according to the first embodiment of the invention.

FIG. 3 is a diagram depicting waveforms for explaining the gate signals G (Gu1, Gv1, Gw1, Gu2, Gv2, Gw2) to be used during the current detection period TA and the current control period TB. FIG. 3 presents the first voltage commands 608 (Vu1, Vv1, Vw1, Vu2, Vv2, Vw2) generated during the current detection period TA and the phase voltage commands V* (Vu1, Vv1, Vw1, Vu2, Vv2, Vw2) generated during the current control period TB together with the carrier wave Ca.

As depicted in FIG. 3, in each control cycle including two successive carrier periods Tc, there are provided the current detection period TA which is 0.5Tc long and the current control period TB which is 1.5Tc long. The gate signals G are repeatedly generated for the individual phases to control the three-phase inverters 201, 202.

Individual phase voltages (individual phase voltage commands) Vu1, Vv1, Vw1 for the first three-phase inverter 201 are AC waveforms which are normally offset by 120° C. from one phase to another. Similarly, individual phase voltages (individual phase voltage commands) Vu2, Vv2, Vw2 for the second three-phase inverter 202 are AC waveforms which are normally offset by 120° C. from one phase to another. For example, when the gate signal Gu1 is at a high (H) level, the MOSFET 21u is ON and the MOSFET 22u is OFF. Conversely, when the gate signal Gu1 is at a low (L) level, the MOSFET 21u is OFF and the MOSFET 22u is ON. Although there is actually provided a dead time to prevent shortage of the upper-arm MOSFET 21u and the lower-arm MOSFET 22u, for example, a description of the dead time is omitted herein for the sake of simplification. The above explanation applies to the gate signals Gv1, Gw1, Gu2, Gv2, Gw2 as well.

The PWM controller 600 holds the reference gate signals 602 which are preset. The current detection period TA is divided into a plurality of segmental detection periods, five detection periods designated t0 to t4 in this embodiment. The reference gate signals 602 are set with time differences provided for the individual phases in order that the phase currents can be detected during the individual detection periods t0-t4. Also, using the terms "first phase," "second phase" and "third phase" to denote three phases in a decreasing order of the phase voltage, the PWM controller 600 holds the reference gate signals 602 for two pairs of three phases, or a total of six phases.

During the current detection period TA, the PWM controller 600 determines which ones of the reference gate signals 602 for the three phases are to be applied to the U, V and W phases on the basis of a largeness relationship of values of the phase voltages of the first and second three-phase inverters 201, 202, and then determines the gate signals G (Gu1, Gv1, Gw1, Gu2, Gv2, Gw2) to be used as the first gate signals 604. While the largeness relationship among the values of the phase voltages of the first and second three-phase inverters 201, 202 is recognized with reference to the phase voltage target values Vref used in the preceding control cycle, the embodiment may be modified to use a different method in recognizing this relationship.

In this embodiment, the phase voltage target values Vref (Vu1r, Vv1r, Vw1r, Vu2r, Vv2r, Vw2r) which are unillustrated of the first and second three-phase inverters 201, 202 have a relationship expressed by Vu1r>Vv1r>Vw1r and Vu2r>Vv2r>Vw2r and, therefore, the first, second and third phases of the reference gate signals 602 are applied to the U, V and W phases, respectively. While the PWM controller 600 determines the gate signals G (Gu1, Gv1, Gw1, Gu2, Gv2, Gw2) to be used as the first gate signals 604, the gate signals G unrelated to operation for controlling the phase currents are used during the current detection period TA.

While the embodiment has thus far been described as employing an arrangement in which the PWM controller 600 holds the reference gate signals 602, the same result as obtained by using the reference gate signals 602 will be obtained even if the PWM controller 600 holds and uses reference voltage commands corresponding to the reference gate signals 602. In this case, the PWM controller 600 generates the first voltage commands 608 (Vu1, Vv1, Vw1, Vu2, Vv2, Vw2) on the basis of the relationship among the values of the phase voltages of the first and second three-phase inverters 201, 202 and determines the gate signals G (Gu1, Gv1, Gw1, Gu2, Gv2, Gw2) to be used as the first gate signals 604 on the basis of a comparison between the first voltage commands 608 and the carrier wave Ca.

The first gate signals 604 determined as described above, or the gate signals G to be used for the individual phases during each current detection period TA, are input into the output current calculating unit 500, and the output current calculating unit 500 calculates the individual phase currents i (iu1, iv1, iw1, iu2, iv2, iw2) from the detected current Idc received from the current detecting device 400 and the gate signals G for the individual phases.

Described hereunder are voltage vectors and the phase currents i detected by calculation during the individual detection periods t0-t4 which are defined by dividing the current detection period TA into five segmental periods. A voltage vector is a vectorial representation of a three-phase voltage indicating the value of each phase by 0 or 1. The voltage vector having a "0" value indicates a switching state in which a high-voltage-side MOSFET is OFF and a low-voltage-side MOSFET is ON, whereas the voltage vector having a "1" value indicates a switching state in which a high-voltage-side MOSFET is ON and a low-voltage-side MOSFET is OFF.

FIG. 4 is a tabular representation of a relationship between voltage vectors of the first three-phase inverter 201 and switching states of the individual MOSFETs, and FIG. 5 is a tabular representation of a relationship between voltage vectors of the second three-phase inverter 202 and switching states of the individual MOSFETs.

The term "detectable current" used respectively in FIGS. 4 and 5 for the first and second three-phase inverters 201, 202 refers to a situation where the voltage vector of the three-phase inverter on an opposite side is (0, 0, 0) or (1, 1, 1).

During the detection period t0, the voltage vector of the first three-phase inverter 201 is V10 (0, 0, 0) and the voltage vector of the second three-phase inverter 202 is V20 (0, 0, 0), so that no current flows through the current detecting device 400.

During the detection period t1, the voltage vector of the first three-phase inverter 201 is V14 (1, 0, 0) and the voltage vector of the second three-phase inverter 202 is V20 (0, 0, 0), so that current iu1 flows through the current detecting device 400 and, thus, the phase current iu1 flowing in the U phase of the first three-phase inverter 201 can be detected.

During the detection period t2, the voltage vector of the first three-phase inverter 201 is V16 (1, 1, 0) and the voltage vector of the second three-phase inverter 202 is V20 (0, 0, 0), so that current −iw1 flows through the current detecting device 400 and, thus, the phase current iw1 flowing in the W phase of the first three-phase inverter 201 can be detected. Since the total value of the three phase currents equals 0, phase current iv1 flowing in the V phase of the first three-phase inverter 201 at this point in time is given by:

$$iv1 = -iu1 - iw1$$

During the detection period t3, the voltage vector of the first three-phase inverter 201 is V17 (1, 1, 1) and the voltage vector of the second three-phase inverter 202 is V24 (1, 0, 0), so that current iu2 flows through the current detecting device 400 and, thus, the phase current iu2 flowing in the U phase of the second three-phase inverter 202 can be detected.

During the detection period t4, the voltage vector of the first three-phase inverter 201 is V17 (1, 1, 1) and the voltage vector of the second three-phase inverter 202 is V26 (1, 1, 0), so that current −iw2 flows through the current detecting device 400 and, thus, the phase current iw2 flowing in the W phase of the second three-phase inverter 202 can be detected. Phase current iv2 flowing in the V phase of the second three-phase inverter 202 can be calculated from current values of the other two phases at this point in time.

During the current control period TB, the target voltage generator 601 generates the individual phase voltage target values Vref for the first and second three-phase inverters 201, 202 and the compensator 605 generates the phase voltage commands V* by correcting the phase voltage target values Vref in order that the phase currents detected in the immediately preceding current detection period TA would follow the respective phase current command values i*.

Figure 6:
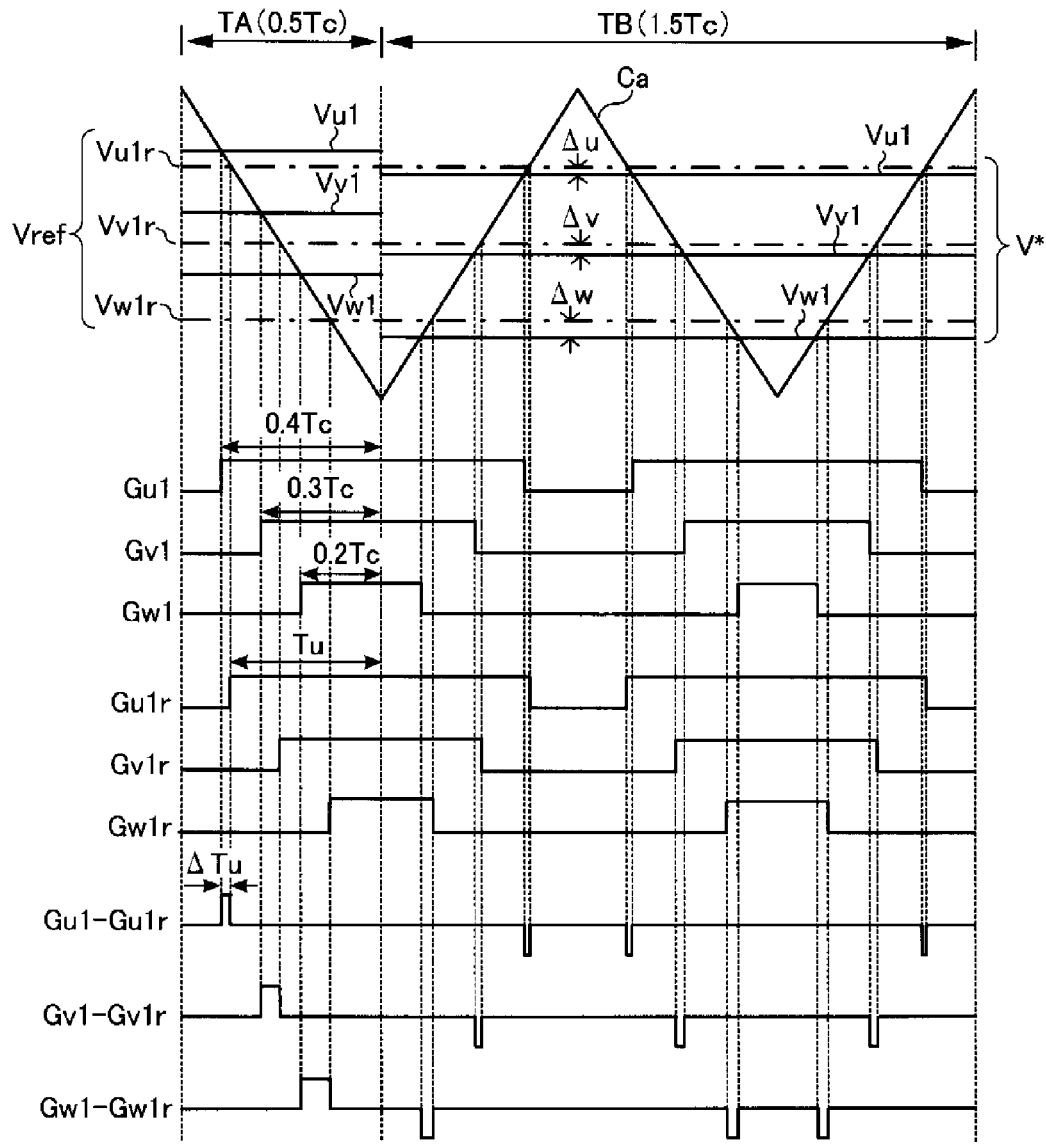
FIG. 6 is a diagram depicting waveforms for explaining how phase voltage commands and gate signals are generated during a current control period according to the first embodiment of the invention.

FIG. 6 is a diagram depicting waveforms for explaining how the phase voltage commands V* (Vu1, Vv1, Vw1) and the gate signals G (Gu1, Gv1, Gw1) for the first three-phase inverter 201 are generated during the current control period TB. Since the phase voltage commands V* (Vu2, Vv2, Vw2) and the gate signals G (Gu2, Gv2, Gw2) for the second three-phase inverter 202 are generated in a like fashion, illustration and description of these phase voltage commands V* and gate signals G are not provided here.

As can be seen from FIG. 6, because the gate signals G (Gu1, Gv1, Gw1) which become the first gate signals 604 are generated on the basis of the reference gate signals 602 during the current detection period TA, there exist voltage errors in the output voltages which are controlled by the first voltage commands 608 (Vu1, Vv1, Vw1) as compared to the respective phase voltage target values Vref (Vu1r, Vv1r, Vw1r). Designated by Gu1r, Gv1r and Gw1r are gate signals corresponding to the respective phase voltage target values Vref, and these gate signals (Gu1r, Gv1r, Gw1r) have differences (Gu1−Gu1r, Gv1−Gv1r, Gw1−Gw1r) with respect to the actual gate signals G (Gu1, Gv1, Gw1).

During the current control period TB, the PWM controller 600 generates the phase voltage commands V* (Vu1, Vv1, Vw1) by correcting the phase voltage target values Vref so as to cancel out the aforementioned voltage errors. Then, the PWM controller 600 generates the gate signals G (Gu1, Gv1, Gw1) which become the second gate signals 607 on the basis of a comparison between the phase voltage commands V* and the carrier wave Ca.

Described now in the following is how the phase voltage target value Vref for the U phase is corrected for generating the phase voltage command V*.

Expressing the phase voltage target value for the U phase by Vu1r=α and the peak-to-peak value of the carrier wave Ca by Vc, the width of a pulse Tu (i.e., an ON duration of the gate signal Gu1r within the current detection period TA) which should be output for the U phase during the current detection period TA (0.5Tc) is given as follows:

$$Tu = 0.5Tc \times (\alpha + Vc/2)/Vc$$

The width of a pulse actually output during the current detection period TA (i.e., 0.4Tc: an ON duration of the gate signal Gu1 within the current detection period TA) has a difference ΔTu given as follows with respect to the width of the pulse Tu:

$$\Delta Tu = 0.4Tc - Tu = 0.4Tc - 0.5Tc \times (\alpha + Vc/2)/Vc$$

The amount of correction Δu to be generated during the current control period TB (1.5Tc) for making up for the voltage error caused by the difference ΔTu is calculated as follows:

$$\Delta u = -(Vc \times \Delta Tu)/1.5Tc$$

$$= (0.5Tc \times (\alpha + Vc/2) - 0.4Tc \times Vc)/1.5Tc$$

$$= \alpha/3 - 0.1Vc$$

The phase voltage command V* (Vu1) is generated by adding Δu to the phase voltage target value Vu1r (=α) during the current control period TB.

The amounts of correction Δv, Δw for the V and W phases can also be calculated in the aforementioned manner and the phase voltage commands V* (Vv1, Vw1) are generated in a similar way.

The phase voltage commands V* are generated during the current control period TB so as to cancel out the voltage errors in the output voltages which should be output during the current detection period TA as described above.

Meanwhile, the aforementioned correction is intended to ensure that an average value of output voltages of each phase equals the value of a voltage which should be output, or the phase voltage target value Vref, during each control cycle, although the invention is not limited to the above-described method of correction but may employ other correction method.

As thus far described, the first embodiment employs an arrangement in which each control cycle of the PWM controller 600 includes the current detection period TA and the current control period TB, the current flowing through the DC source line 110 is detected during the current detection period TA, and current values of the individual phases are calculated by using the gate signals G. This arrangement makes it possible to determine the current values of the individual phases by use of the single current detecting device 400. Also, as the PWM controller 600 performs PWM control operation while calculating the phase voltage commands V* during the current control period TB so as to cancel out the voltage errors occurring in the output voltages during the current detection period TA, it is possible to suppress distortions of voltage and current output waveforms.

As will be appreciated from the above, the present embodiment makes it possible to reliably detect the individual phase currents, suppress distortions of voltage and current output waveforms, and reliably obtain a desired output with a compact, simple and inexpensive apparatus structure.

Furthermore, in a power converting apparatus employing a multiplex configuration involving an increased number of kinds of phase currents, it is possible to combine a conventionally large number of devices needed for current detection into a single device, thereby allowing a remarkable reduction in size and simplification of the apparatus structure.

Additionally, the gate signals G generated during each current detection period TA are set in such a manner that pulse widths of the gate signals G become progressively larger in the order of phases producing increasingly higher voltages. This makes it possible to reduce the amounts of correction during the current control period TB and obtain a more stable output.

Second Embodiment

Figure 7:
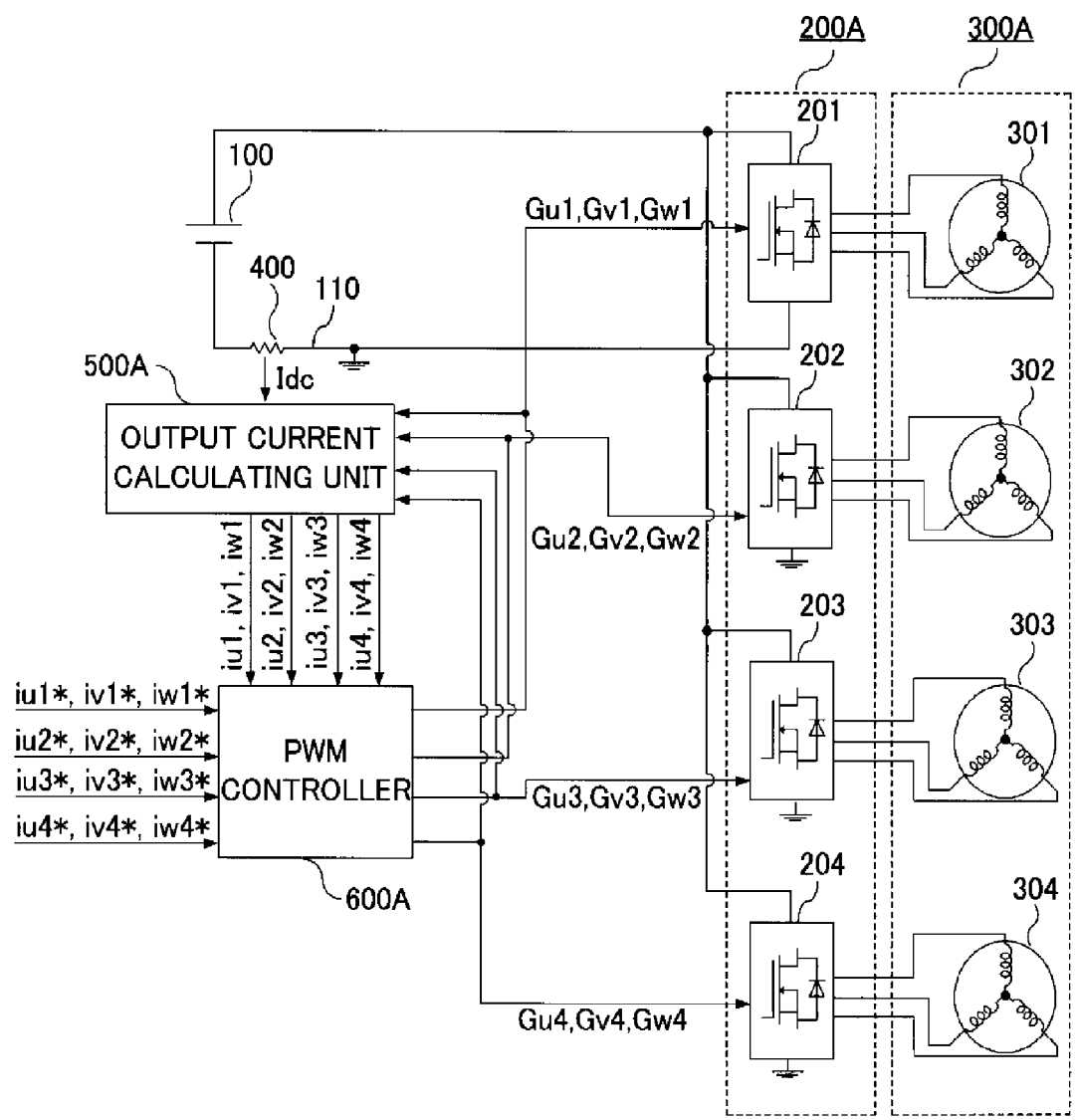
FIG. 7 is a diagram depicting the configuration of a motor driving system implementing a power converting apparatus according to a second embodiment of the invention.

FIG. 7 is a diagram depicting the configuration of a motor driving system implementing a power converting apparatus according to a second embodiment of the present invention.

Configured as depicted in FIG. 7, the motor driving system converts DC power fed from a DC power source 100 into AC power by means of a multiplex power converter 200A and supplies the AC power to a motor 300A. While the foregoing first embodiment employs the multiplex power converter 200 having a duplicate multiplex configuration, the multiplex power converter 200A of the second embodiment constituting a main circuit unit of the power converting apparatus has a quadruple multiplex configuration in which first to fourth three-phase inverters 201-204 are connected in parallel on a DC side. Also, the motor 300A is a 12-phase motor having four pairs of three-phase windings 301-304.

For controlling the multiplex power converter 200A, the power converting apparatus includes a current detecting device 400, an output current calculating unit 500A serving as a current processor and a control unit including a PWM controller 600A. Each of the first to fourth three-phase inverters 201-204 is configured in a way similar to the foregoing first embodiment depicted in FIG. 2, and the PWM controller 600A is configured similarly to what is depicted in FIG. 1B.

In the multiplex power converter 200A, outputs of the first to fourth three-phase inverters 201, 202, 203, 204 are controlled respectively by gate signals G (Gu1, Gv1, Gw1), (Gu2, Gv2, Gw2), (Gu3, Gv3, Gw3) and (Gu4, Gv4, Gw4) supplied from the PWM controller 600A of the control unit for the individual phases. The first to fourth three-phase inverters 201-204 drive the three-phase windings 301-304 of the motor 300A, respectively. The first to fourth three-phase inverters 201-204 are connected in parallel on the DC side so that phase currents i of a total of 12 phases flow commonly through a DC source line 110 connected to the DC power source 100. The current detecting device 400 detects current Idc that flows through this DC source line 110.

As is the case with the foregoing first embodiment, there are provided a current detection period TA (0.5Tc) and a subsequent current control period TB (1.5Tc) in each control cycle of the PWM controller 600A which includes two successive carrier periods Tc.

The gate signals G to be used for the individual phases during each current detection period TA are input into the output current calculating unit 500A. The output current calculating unit 500A calculates individual phase currents i (iu1−iw1, iu2−iw2, iu3−iw3, iu4−iw4) using information on the detected current Idc received from the current detecting device 400 and the gate signals G for the individual phases.

The individual phase currents i calculated by the output current calculating unit 500A and individual phase current command values i* (iu1*−iw1*, iu2*−iw2*, iu3*−iw3*, iu4*−iw4*) are input into the PWM controller 600A. The phase current command values i* are for controlling frequency commands or torque commands given to the motor 300A to have desired values, or for controlling the motor 300A to operate in a desired state. It is possible to use a reference sine wave for obtaining the phase current command values i*.

Figure 8:
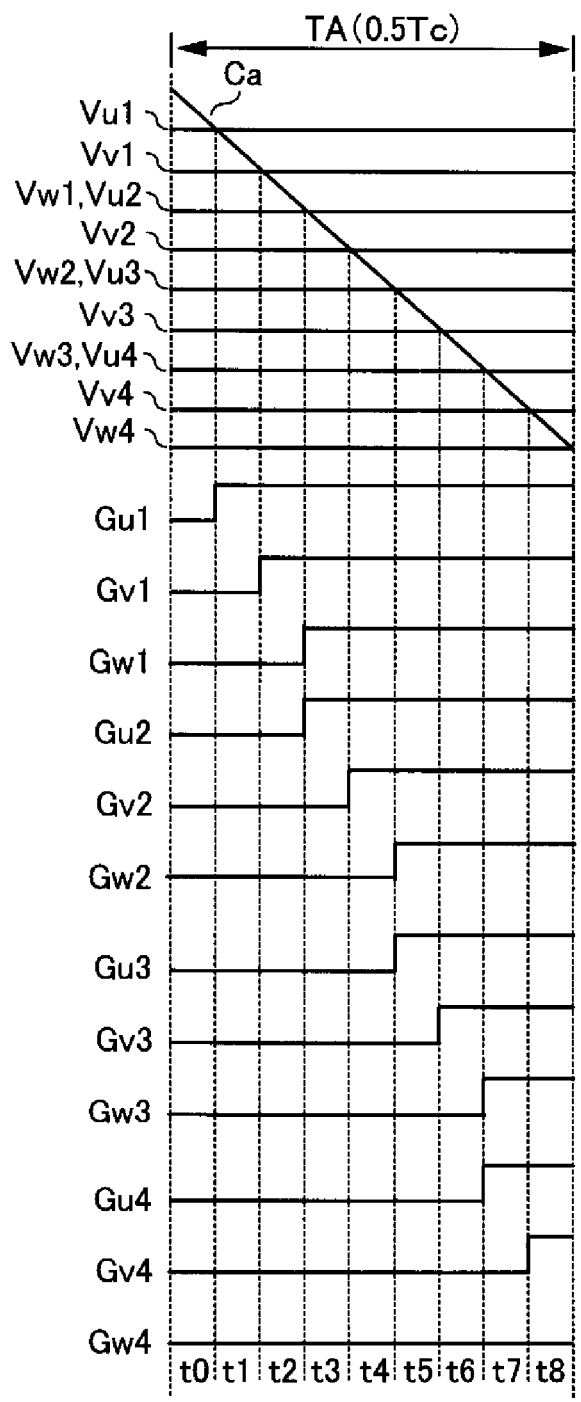
FIG. 8 is a diagram depicting waveforms for explaining gate signals used during a current detection period according to the second embodiment of the invention.

FIG. 8 presents the gate signals G (Gu1−Gw1, Gu2−Gw2, Gu3−Gw3, Gu4−Gw4) and first voltage commands 608 (Vu1−Vw1, Vu2−Vw2, Vu3−Vw3, Vu4−Vw4) to be used during the current detection period TA together with the carrier wave Ca.

The PWM controller 600A holds reference gate signals 602 which are preset. The current detection period TA is divided into a plurality of segmental detection periods, nine detection periods designated t0 to t8 in this embodiment. The reference gate signals 602 are set with time differences provided for the individual phases in order that the phase currents can be detected during the individual detection periods t0-t8. As in the foregoing first embodiment, the PWM controller 600A determines which phases of the reference gate signals 602 are to be applied to the U, V and W phases on the basis of a relationship (largeness) of values of phase voltages of the first to fourth three-phase inverters 201-204, and then generates the gate signals G to be used as first gate signals 604 and the first voltage commands 608.

In this case, output voltages (phase voltage target values Vref) of the individual phases of the first to fourth three-phase inverters 201-204 are applied to the U, V and W phases in descending order and, thus, the first voltage commands 608 generated during the current detection period TA are set to satisfy a relationship expressed by Vu1>Vv1>Vw1 (=Vu2)>Vv2>Vw2 (=Vu3)>Vv3>Vw3 (=Vu4)>Vv4>Vw4.

The output current calculating unit 500A first detects the phase currents iu1−iw1 of the first three-phase inverter 201. Then, the output current calculating unit 500A detects the phase currents iu2−iw2 of the second three-phase inverter 202, the phase currents iu3−iw3 of the third three-phase inverter 203, and the phase currents iu4−iw4 of the fourth three-phase inverter 204 in this order. While the output current calculating unit 500A sequentially detects the phase currents, beginning from the phase currents iu1−iw1 of the first three-phase inverter 201, in this embodiment, the invention is not limited to this arrangement. Also, this arrangement may be modified in such a manner that the output current calculating unit 500A first detects the U-phase current iu1 of the first three-phase inverter 201 and, then, the U-phase current iu2 of the second three-phase inverter 202 and the U-phase current iu3 of the third three-phase inverter 203 in this order. What is necessary is that when the output current calculating unit 500A is detecting the phase currents of one of the three-phase inverters, voltage vectors of the other three-phase inverters be (0, 0, 0) or (1, 1, 1).

Described hereunder are voltage vectors and the phase currents i detected by calculation during the individual detection periods t0-t8 which are defined by dividing the current detection period TA into nine segmental periods.

Operation performed during the detection periods t0-t4 is the same as discussed in the first embodiment with reference to FIG. 3.

During the detection period t5, the voltage vectors of the first and second three-phase inverters 201, 202 are both (1, 1, 1), the voltage vector of the fourth three-phase inverter 204 is (0, 0, 0) and the voltage vector of the third three-phase inverter 203 is (1, 0, 0), so that current iu3 flows through the current detecting device 400 and, thus, the phase current iu3 flowing in the U phase of the third three-phase inverter 203 can be detected.

During the detection period t6, the voltage vectors of the first and second three-phase inverters 201, 202 are both (1, 1, 1), the voltage vector of the fourth three-phase inverter 204 is (0, 0, 0) and the voltage vector of the third three-phase inverter 203 is (1, 1, 0), so that current −iw3 flows through the current detecting device 400 and, thus, the phase current iw3 flowing in the W phase of the third three-phase inverter 203 can be detected. Since the total value of the three phase currents equals 0, phase current iv3 flowing in the V phase of the third three-phase inverter 203 at this point in time is given by:

$$iv3 = -iu3 - iw3$$

During the detection period t7, the voltage vectors of the first to third three-phase inverters 201-203 are all (1, 1, 1) and the voltage vector of the fourth three-phase inverter 204 is (1, 0, 0), so that current iu4 flows through the current detecting device 400 and, thus, the phase current iu4 flowing in the U phase of the fourth three-phase inverter 204 can be detected.

During the detection period t8, the voltage vectors of the first to third three-phase inverters 201-203 are all (1, 1, 1) and the voltage vector of the fourth three-phase inverter 204 is (1, 1, 0), so that current −iw4 flows through the current detecting device 400 and, thus, the phase current iw4 flowing in the W phase of the fourth three-phase inverter 204 can be detected. Since the total value of the three phase currents equals 0, phase current iv4 flowing in the V phase of the fourth three-phase inverter 204 at this point in time is given by:

$$iv4 = -iu4 - iw4$$

The PWM controller 600A acquires the individual phase currents i detected as described above and the target voltage generator 601 generates the phase voltage target values Vref which are target values of the output voltages of the individual phases of the first to fourth three-phase inverters 201-204 in order that the phase currents i would follow the respective phase current command values i*.

Then, during the current control period TB, the compensator 605 generates phase voltage commands V* by correcting the phase voltage target values Vref in the same fashion as in the first embodiment. Here, when the first voltage commands 608 corresponding to the gate signals G (first gate signals 604) generated during each current detection period TA are input, the compensator 605 generates the phase voltage commands V* so as to cancel out voltage errors that have occurred during the relevant current detection period TA. Then, the second gate signal generator 606 generates the gate signals G which become second gate signals 607 on the basis of a comparison between the phase voltage commands V* and the carrier wave Ca.

Like the earlier-described first embodiment, the present embodiment makes it possible to determine the current values of the individual phases by use of the single current detecting device 400, reliably detect the individual phase currents, suppress distortions of voltage and current output waveforms, and reliably obtain a desired output with a compact, simple and inexpensive apparatus structure. As the second embodiment employs the multiplex power converter 200A having a quadruple multiplex configuration, it is possible to combine a conventionally large number of devices needed for current detection into a single device, thereby providing an even more reduction in size and further simplification of the apparatus structure than the first embodiment.

Third Embodiment

While the current detection period TA and the current control period TB are set at 0.5Tc and 1.5Tc, respectively, in the foregoing embodiments, the invention is not limited thereto. What is essential is that the control cycle be set at a time period which is an integer multiple of, i.e., one to a few times, the carrier period Tc, the current detection period TA which is synchronized with the carrier period Tc be set at an integer multiple of 0.5Tc, and the current control period TB be set at a time period which is equal to or longer than the current detection period TA.

A third embodiment described hereunder employs a power converting apparatus which has the same configuration as the foregoing first embodiment depicted in FIGS. 1A and 1B but performs control operation using reference gate signals 602 which differ from those of the first embodiment.

Figure 9:
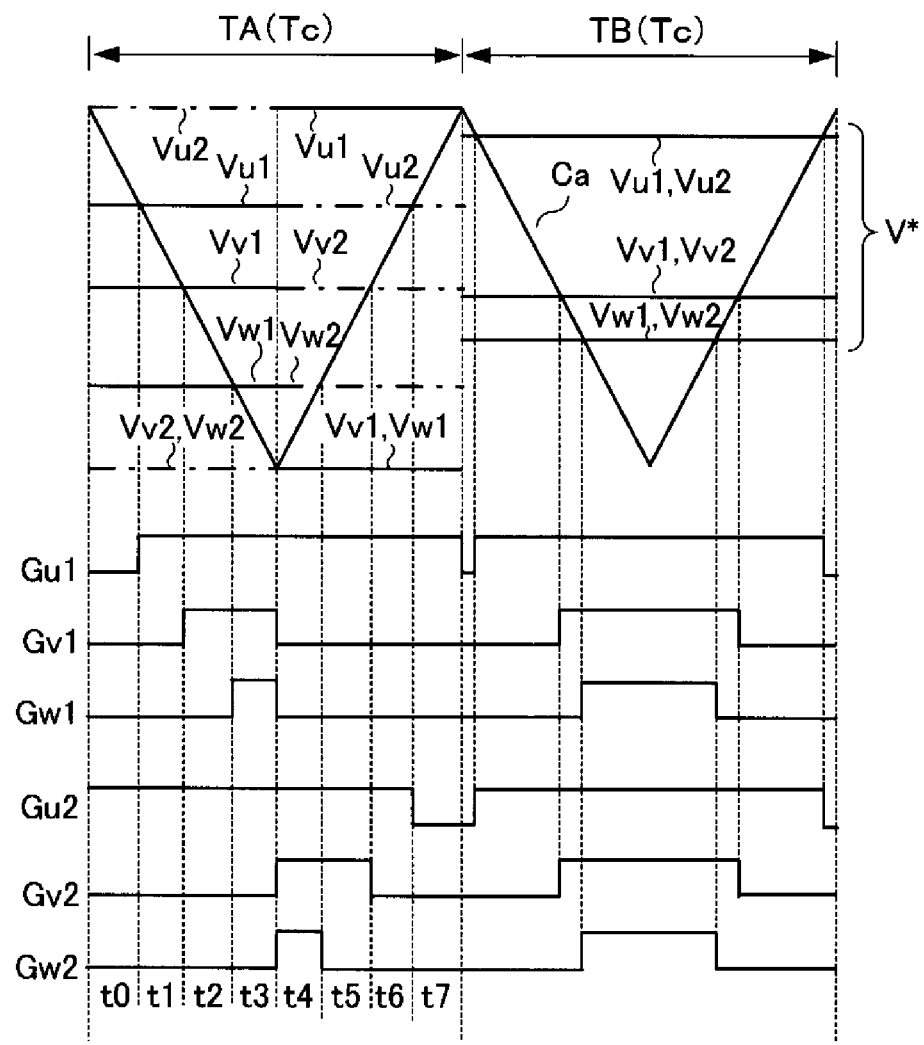
FIG. 9 is a diagram depicting waveforms for explaining gate signals used for control operation according to a third embodiment of the invention.

FIG. 9 is a diagram depicting waveforms for explaining gate signals G (Gu1, Gv1, Gw1, Gu2, Gv2, Gw2) to be used during the current detection period TA and the current control period TB. FIG. 9 presents the first voltage commands 608 (Vu1, Vv1, Vw1, Vu2, Vv2, Vw2) generated during the current detection period TA and the phase voltage commands V* (Vu1, Vv1, Vw1, Vu2, Vv2, Vw2) generated during the current control period TB together with the carrier wave Ca.

As depicted in FIG. 9, in each control cycle including two successive carrier periods Tc, there are provided the current detection period TA and the current control period TB which are both the same period of time as Tc. The gate signals G are repeatedly generated for the individual phases to control the first and second three-phase inverters 201, 202.

The current detection period TA is divided into a plurality of segmental detection periods, eight detection periods designated t0 to t7 in this embodiment. The reference gate signals 602 are set with time differences provided for the individual phases in order that phase currents can be detected during the individual detection periods t0-t7. Also, the phase voltage commands are varied between a first half (0.5Tc) of the current detection period TA and a latter half (0.5Tc) thereof.

In this case, output voltages (phase voltage target values Vref) of the individual phases of the first and second three-phase inverters 201, 202 are applied to the U, V and W phases in descending order. The PWM controller 600 determines which phases of the reference gate signals 602 are to be applied to the U, V and W phases on the basis of a relationship (largeness) of values of phase voltages of the first and second three-phase inverters 201, 202, and then generates the gate signals G to be used as first gate signals 604 and the first voltage commands 608.

In this embodiment, the first voltage commands 608 are set to satisfy a relationship expressed by Vu2>Vu1>Vv1>Vw1>Vv2 (=Vw2) in the first half (0.5Tc) of the current detection period TA and to satisfy a relationship expressed by Vu1>Vu2>Vv2>Vw2>Vv1 (=Vw1) in the latter half (0.5Tc).

Described hereunder are voltage vectors and the phase currents i detected by calculation during the individual detection periods t0-t7 which are defined by dividing the current detection period TA into eight segmental periods.

During the detection period t0, the voltage vector of the first three-phase inverter 201 is V10 (0, 0, 0) and the voltage vector of the second three-phase inverter 202 is V24 (1, 0, 0), so that current iu2 flows through the current detecting device 400 and, thus, the phase current iu2 flowing in the U phase of the second three-phase inverter 202 can be detected.

During the detection period t1, the voltage vector of the first three-phase inverter 201 is V14 (1, 0, 0) and the voltage vector of the second three-phase inverter 202 is V24 (1, 0, 0), so that current (iu1+iu2) flows through the current detecting device 400. Since the phase current iu2 is already detected, phase current iu1 flowing in the U phase of the first three-phase inverter 201 can be detected.

During the detection period t2, the voltage vector of the first three-phase inverter 201 is V16 (1, 1, 0) and the voltage vector of the second three-phase inverter 202 is V24 (1, 0, 0), so that current (−iw1+iu2) flows through the current detecting device 400. Since the phase current iu2 is already detected, phase current iw1 flowing in the W phase of the first three-phase inverter 201 can be detected.

During the detection period t5, the voltage vector of the first three-phase inverter 201 is V14 (1, 0, 0) and the voltage vector of the second three-phase inverter 202 is V26 (1, 1, 0), so that current (iu1−iw2) flows through the current detecting device 400. Since the phase current iu1 is already detected, phase current iw2 flowing in the W phase of the second three-phase inverter 202 can be detected.

Since the phase currents flowing in the U and W phases of the first and second three-phase inverters 201, 202 are already detected at this point in time, phase currents iv1 and iv2 flowing in the V phase can be detected by calculation.

Like the earlier-described first embodiment, the present embodiment makes it possible to determine the current values of the individual phases by use of the single current detecting device 400, reliably detect the individual phase currents, suppress distortions of voltage and current output waveforms, and reliably obtain a desired output with a compact, simple and inexpensive apparatus structure.

Additionally, the present embodiment makes it possible to set a long pulse width for a phase producing a high voltage, the U phase in this case, in the current detection period TA for both the first and second three-phase inverters 201, 202. It is therefore possible to reliably output desired voltages while suppressing a voltage reduction even when both of the first and second three-phase inverters 201, 202 have a high modulation factor in the U phase.

Fourth Embodiment

A fourth embodiment described hereunder employs a power converting apparatus which has the same configuration as the foregoing first embodiment depicted in FIGS. 1A and 1B but performs control operation using reference gate signals 602 which further differ from those of the first embodiment.

Figure 10:
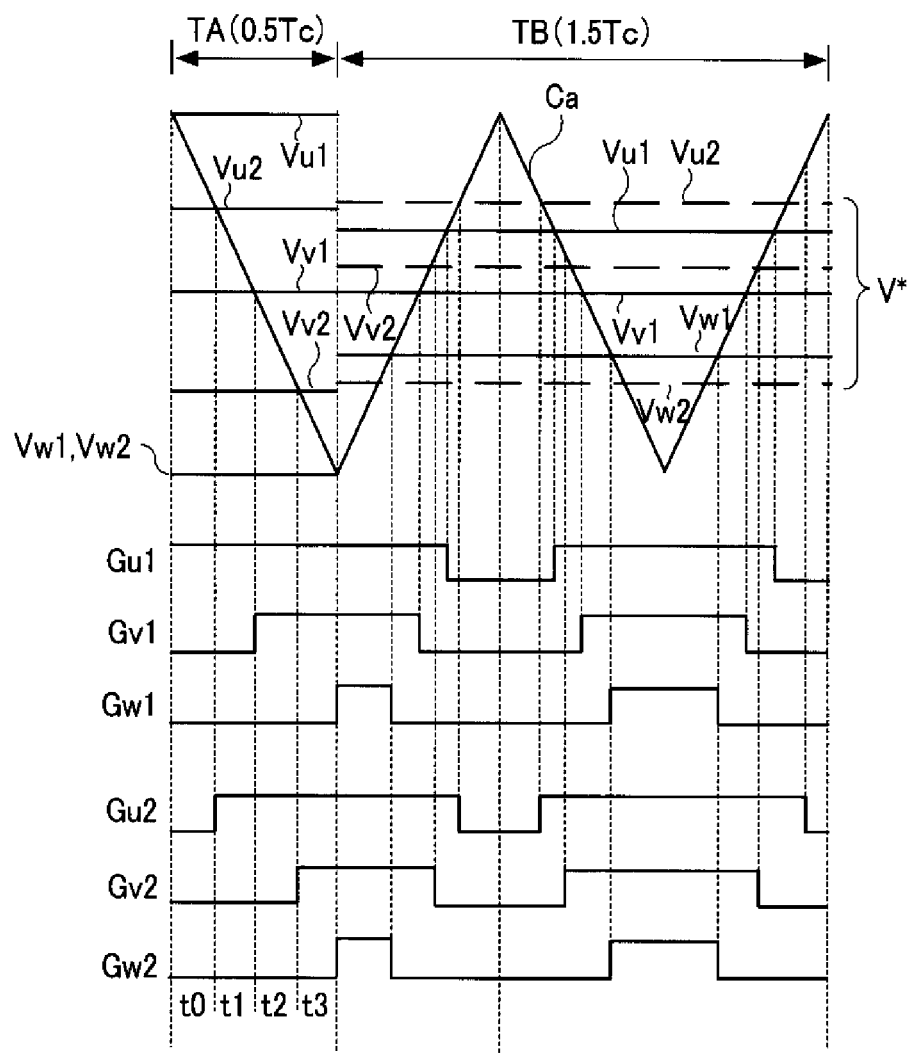
FIG. 10 is a diagram depicting waveforms for explaining gate signals used for control operation according to a fourth embodiment of the invention.

FIG. 10 is a diagram depicting waveforms for explaining gate signals G (Gu1, Gv1, Gw1, Gu2, Gv2, Gw2) to be used during the current detection period TA and the current control period TB. FIG. 10 presents the first voltage commands 608 (Vu1, Vv1, Vw1, Vu2, Vv2, Vw2) generated during the current detection period TA and the phase voltage commands V* (Vu1, Vv1, Vw1, Vu2, Vv2, Vw2) generated during the current control period TB together with the carrier wave Ca.

As depicted in FIG. 10, there are provided the current detection period TA (0.5Tc) and the current control period TB (1.5Tc) in each control cycle which includes two successive carrier periods Tc. The gate signals G are repeatedly generated for the individual phases to control the first and second three-phase inverters 201, 202.

The current detection period TA is divided into a plurality of segmental detection periods, four detection periods designated t0 to t3 in this embodiment. The reference gate signals 602 are set with time differences provided for the individual phases in order that phase currents can be detected during the individual detection periods t0-t3.

Output voltages (phase voltage target values Vref) of the individual phases of the first and second three-phase inverters 201, 202 are applied to the U, V and W phases in descending order. The PWM controller 600 determines which phases of the reference gate signals 602 are to be applied to the U, V and W phases on the basis of a largeness relationship of values of phase voltages of the first and second three-phase inverters 201, 202, and then generates the gate signals G to be used as first gate signals 604 and the first voltage commands 608.

In this embodiment, the first voltage commands 608 are set to satisfy a relationship expressed by Vu1>Vu2>Vv1>Vv2>Vw1 (=Vw2).

Described hereunder are voltage vectors and the phase currents i detected by calculation during the individual detection periods t0-t3 which are defined by dividing the current detection period TA into four segmental periods.

During the detection period t0, the voltage vector of the first three-phase inverter 201 is V14 (1, 0, 0) and the voltage vector of the second three-phase inverter 202 is V20 (0, 0, 0), so that current iu1 flows through the current detecting device 400 and, thus, the phase current iu1 flowing in the U phase of the first three-phase inverter 201 can be detected.

During the detection period t1, the voltage vector of the first three-phase inverter 201 is V14 (1, 0, 0) and the voltage vector of the second three-phase inverter 202 is V24 (1, 0, 0), so that current (iu1+iu2) flows through the current detecting device 400. Since the phase current iu1 is already detected, phase current iu2 flowing in the U phase of the second three-phase inverter 202 can be detected.

During the detection period t2, the voltage vector of the first three-phase inverter 201 is V16 (1, 1, 0) and the voltage vector of the second three-phase inverter 202 is V24 (1, 0, 0), so that current (−iw1+iu2) flows through the current detecting device 400. Since the phase current iu2 is already detected, phase current iw1 flowing in the W phase of the first three-phase inverter 201 can be detected.

During the detection period t3, the voltage vector of the first three-phase inverter 201 is V16 (1, 1, 0) and the voltage vector of the second three-phase inverter 202 is V26 (1, 1, 0), so that current (−iw1−iw2) flows through the current detecting device 400. Since the phase current iw1 is already detected, phase current iw2 flowing in the W phase of the second three-phase inverter 202 can be detected.

Since the phase currents flowing in the U and W phases of the first and second three-phase inverters 201, 202 are already detected at this point in time, phase currents iv1 and iv2 flowing in the V phase can be detected by calculation.

Like the earlier-described first embodiment, the present embodiment makes it possible to determine the current values of the individual phases by use of the single current detecting device 400, reliably detect the individual phase currents, suppress distortions of voltage and current output waveforms, and reliably obtain a desired output with a compact, simple and inexpensive apparatus structure.

Additionally, like the foregoing third embodiment, the present embodiment makes it possible to set a long pulse width for a phase producing a high voltage, the U phase in this case, in the current detection period TA for both the first and second three-phase inverters 201, 202. It is therefore possible to output desired voltages while suppressing a voltage reduction in a reliable fashion.

Fifth Embodiment

A fifth embodiment described hereunder employs a power converting apparatus which has the same configuration as the foregoing first embodiment depicted in FIGS. 1A and 1B but performs control operation using reference gate signals 602 which still further differ from those of the first embodiment.

Figure 11:
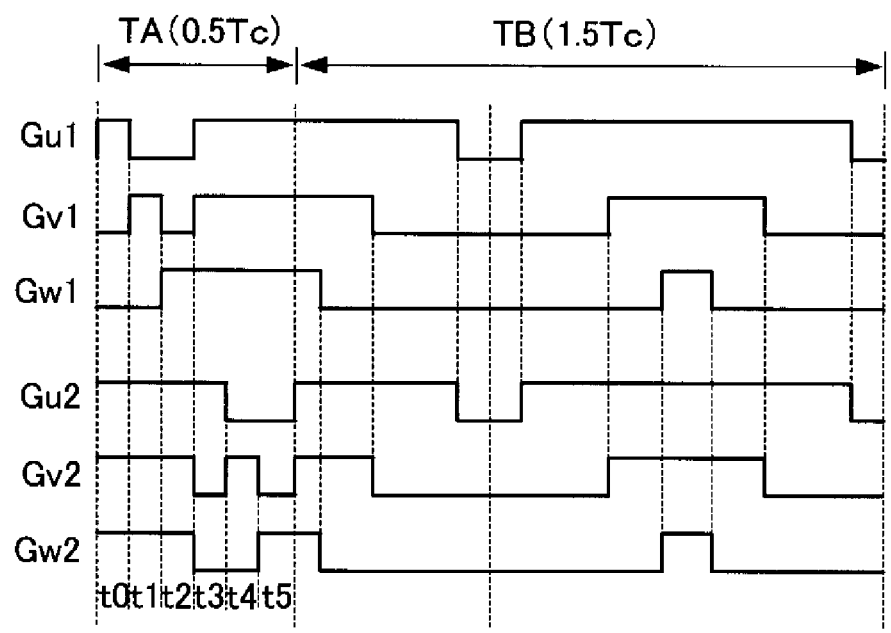
FIG. 11 is a diagram depicting waveforms for explaining gate signals used for control operation according to a fifth embodiment of the invention.

FIG. 11 is a diagram depicting waveforms for explaining gate signals G (Gu1, Gv1, Gw1, Gu2, Gv2, Gw2) to be used during the current detection period TA and the current control period TB.

As depicted in FIG. 11, there are provided the current detection period TA (0.5Tc) and the current control period TB (1.5Tc) in each control cycle which includes two successive carrier periods Tc. The gate signals G are repeatedly generated for the individual phases to control the first and second three-phase inverters 201, 202.

The current detection period TA is divided into a plurality of segmental detection periods, six detection periods designated t0 to t5 in this embodiment. The reference gate signals 602 are set with time differences provided for the individual phases in order that phase currents i can be detected during the individual detection periods t0-t5. Here, the reference gate signals 602 are generated in such a manner that the phase current i for one phase can be detected during each of the detection periods t0-t5.

In this embodiment, there is no difference in ON periods of the reference gate signals 602 among the individual phases and, thus, it is possible to freely determine which ones of the reference gate signals 602 for the three phases are to be applied to the U, V and W phases of the first and second three-phase inverters 201, 202 and generate the gate signals G to be used as first gate signals 604 as well as first voltage commands 608 accordingly.

Described hereunder are voltage vectors and the phase currents i detected by calculation during the individual detection periods t0-t5 which are defined by dividing the current detection period TA into six segmental periods.

During the detection period t0, the voltage vector of the first three-phase inverter 201 is V14 (1, 0, 0) and the voltage vector of the second three-phase inverter 202 is V27 (1, 1, 1), so that current iu1 flows through the current detecting device 400 and, thus, the phase current iu1 flowing in the U phase of the first three-phase inverter 201 can be detected.

During the detection period t1, the voltage vector of the first three-phase inverter 201 is V12 (0, 1, 0) and the voltage vector of the second three-phase inverter 202 is V27 (1, 1, 1), so that current iv1 flows through the current detecting device 400 and, thus, the phase current iv1 flowing in the V phase of the first three-phase inverter 201 can be detected.

During the detection period t2, the voltage vector of the first three-phase inverter 201 is V11 (0, 0, 1) and the voltage vector of the second three-phase inverter 202 is V27 (1, 1, 1), so that current iw1 flows through the current detecting device 400 and, thus, the phase current iw1 flowing in the W phase of the first three-phase inverter 201 can be detected.

During the detection period t3, the voltage vector of the first three-phase inverter 201 is V17 (1, 1, 1) and the voltage vector of the second three-phase inverter 202 is V24 (1, 0, 0), so that current iu2 flows through the current detecting device 400 and, thus, the phase current iu2 flowing in the U phase of the second three-phase inverter 202 can be detected.

During the detection period t4, the voltage vector of the first three-phase inverter 201 is V17 (1, 1, 1) and the voltage vector of the second three-phase inverter 202 is V22 (0, 1, 0), so that current iv2 flows through the current detecting device 400 and, thus, the phase current iv2 flowing in the V phase of the second three-phase inverter 202 can be detected.

During the detection period t5, the voltage vector of the first three-phase inverter 201 is V17 (1, 1, 1) and the voltage vector of the second three-phase inverter 202 is V21 (0, 0, 1), so that current iw2 flows through the current detecting device 400 and, thus, the phase current iw2 flowing in the W phase of the second three-phase inverter 202 can be detected.

Like the earlier-described first embodiment, the present embodiment makes it possible to determine the current values of the individual phases by use of the single current detecting device 400, reliably detect the individual phase currents, suppress distortions of voltage and current output waveforms, and reliably obtain a desired output with a compact, simple and inexpensive apparatus structure.

Furthermore, as the reference gate signals 602 are set in such a manner that the individual phase currents i can be directly detected in the detection periods t0-t5, the output current calculating unit 500 is required to only determine which phase current i the detected current Idc indicates. This arrangement of the embodiment serves to simplify computation logic. Additionally, it is possible to freely determine which ones of the reference gate signals 602 for the three phases are to be applied to the U, V and W phases of the first and second three-phase inverters 201, 202 and easily determine the gate signals G (first gate signals 604) generated during the current detection period TA.

Meanwhile, the gate signals G used during the current detection period TA are not limited to those used in the foregoing individual embodiments but may be determined in a different way as long as the gate signals G are suited for detecting the individual phase currents i in a plurality of detection periods defined by dividing the current detection period TA.

Also, there may be provided an arrangement for storing more than one kind of reference gate signals 602 used in the foregoing first, third, fourth and fifth embodiments and selecting an optimum one of the reference gate signals 602 for each control cycle.

Furthermore, while the power converting apparatus described in each of the foregoing embodiments employs a multiplex configuration including a plurality of three-phase inverters, a main circuit unit of the power converting apparatus may be configured with a single three-phase inverter. Also, the main circuit unit may be configured with a plurality of parallel-connected single-phase inverters. In either case, a plurality of phase currents i can be detected with a single current detecting device 400, and the aforementioned alternative configurations make it possible to reliably detect the individual phase currents, suppress distortions of voltage and current output waveforms, and reliably obtain a desired output with a compact, simple and inexpensive apparatus structure as is the case with the earlier-described first embodiment.

Moreover, the invention is applicable to a power converting apparatus for converting AC power into DC power by PWM control, yet providing like advantages.

It is to be pointed out that the individual embodiments of the invention thus far described may be freely combined or implemented in a properly modified or simplified form within the scope of the invention defined in the appended claims.

Various modifications and alterations of this invention will be apparent to those skilled in the art without departing from the scope and spirit of this invention, and it should be understood that this is not limited to the illustrative embodiments set forth herein.

What is claimed is:

1. A power converting apparatus having a plurality of phases on an AC side comprising a main circuit unit for performing conversion between DC power fed from a DC power source and AC power and a control unit for repetitively controlling said main circuit unit in successive control cycles, wherein a DC source line through which individual phase currents flowing in the plurality of phases commonly flow is connected to the DC power source, said control unit comprising:
   a current detector for detecting the currents flowing through the DC source line;
   a PWM controller for generating gate signals to be supplied to individual semiconductor switching devices of the plurality of phases of said main circuit unit, said PWM controller having a current detection period and a succeeding current control period within each of the control cycles which are defined based on a carrier period that is the period of carrier waves; and
   a current processor for calculating values of the individual phase currents during the current detection period based on the gate signals fed from said PWM controller and the detected currents fed from said current detector;
   wherein said PWM controller generates the gate signals to be used during the current detection period based on preset reference gate signals, generates phase voltage target values so that the individual phase current values calculated will follow given command values, calculates phase voltage commands by correcting the individual phase voltage target values so as to cancel out voltage errors that occur during the current detection period, and generates the gate signals to be used during the current control period based on a comparison between the individual phase voltage commands and the carrier waves.

2. The power converting apparatus according to claim 1, wherein said main circuit unit includes a multiphase power converter.

3. The power converting apparatus according to claim 2, wherein said main circuit unit includes a plurality of multiphase power converters which are connected in parallel on a DC side and the individual phase currents are currents that flow in the individual phases of the plurality of multiphase power converters.

4. The power converting apparatus according to claim 1, wherein said PWM controller generates the individual phase voltage commands in such a manner that average values of output voltages equal the respective phase voltage target values in each of the control cycles.

5. The power converting apparatus according to claim 1, wherein the reference gate signals are set with time differences provided for the individual phases in order that the phase current values can be calculated during individual detection periods which are defined by dividing the current detection period into a plurality of segmental periods.

6. The power converting apparatus according to claim 5, wherein said PWM controller generates the gate signals during the current detection period by applying the reference gate signals on the basis of a largeness relationship among individual phase voltages of said main circuit unit.

7. The power converting apparatus according to claim 5, wherein said PWM controller uses the reference gate signals selected from more than one kind of reference gate signals in each of the control cycles.

8. The power converting apparatus according to claim 1, wherein each of the control cycles is a time period which is an integer multiple of, including one to a few times, the carrier period, and the current detection period is synchronized with the carrier period and is equal to a time period selected from one half the carrier period and the equivalent of the carrier period.

* * * * *